Patented June 17, 1941

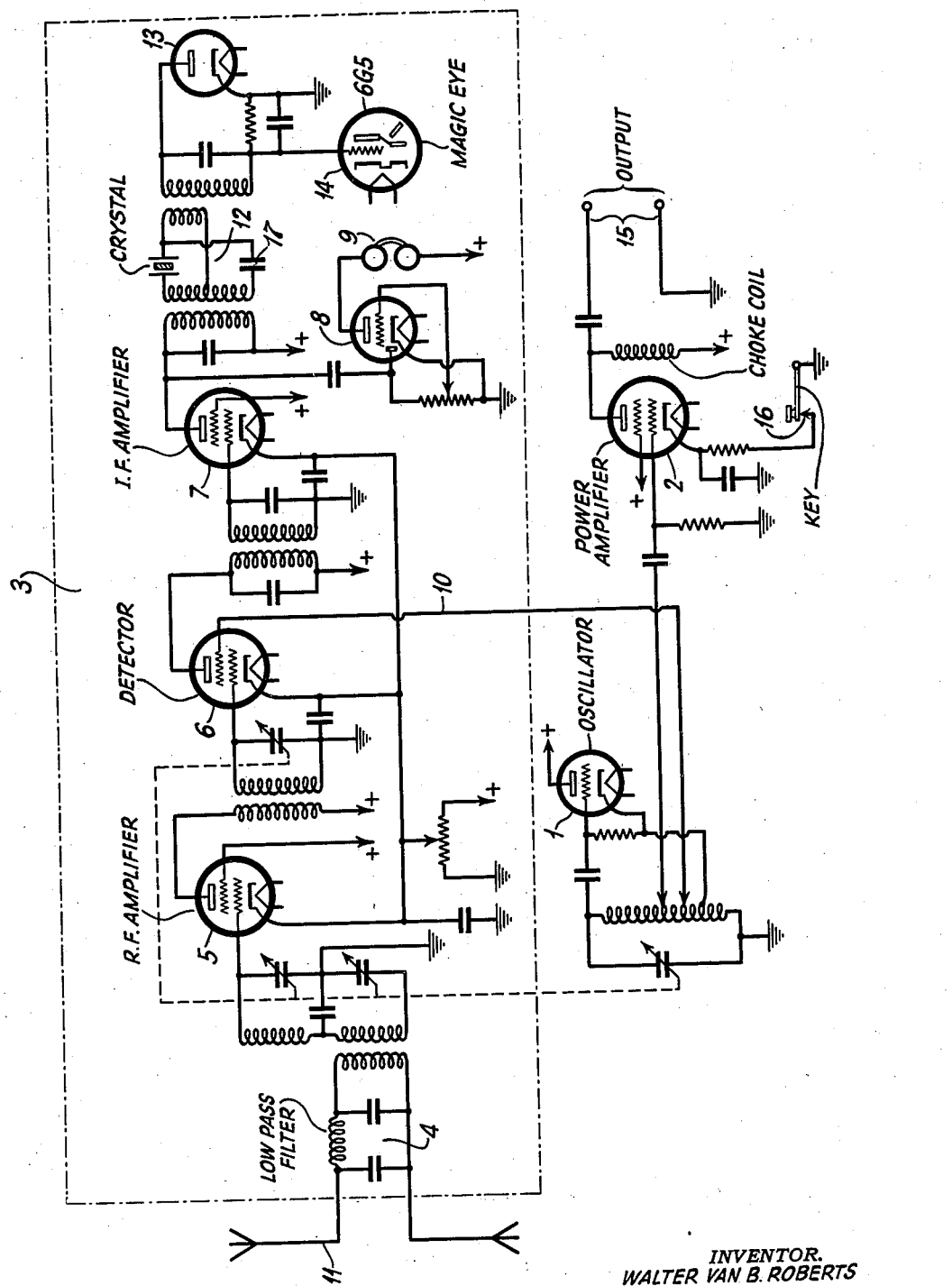
INVENTOR.
WALTER VAN B. ROBERTS
ATTORNEY.

2,245,717

UNITED STATES PATENT OFFICE 2,245,717

WAVE INDICATING SYSTEM

Walter van B. Roberts, Princeton, N. J., assignor to Radio Corporation of America, a corporation of Delaware Application October 29, 1938, Serial No. 237,597

5 Claims. (Cl. 250—39)

This invention relates generally to wave indicating systems, and more particularly to apparatus for determining the exact frequency of an oscillator at any one of a number of different frequencies.

In amateur transmission, as well as some other types of transmission, it is often advantageous to be able to change the frequency of the transmitter to some other frequency determined by the circumstances of the moment. For example, several operators may desire to tune their transmitters to a common frequency so that at each amateur station all of the other stations may be heard without retuning the receiver. It is prohibitively expensive to supply a wide variety of crystals to each transmitter so that there will always be a crystal available for any desired frequency, and for this reason it has become a common practice to use an ordinary oscillator capable of being tuned through a range of frequencies, rather than a crystal controlled oscillator, when great flexibility in choice of frequency is required. However, the use of the ordinary oscillator has always been attended with the danger that the user might not know the exact frequency upon which he was operating and might therefore operate at a frequency outside of the band of frequencies assigned by law. Wave meters have been used for the purpose of measuring the transmitted frequency, but wave meters of an inexpensive sort are not entirely reliable if the desired frequency of operation lies close to the permitted frequency limits. By the use of the present invention, this danger is substantially avoided because the operating frequency is determined in terms of the known frequencies of broadcast stations and the known frequency of a single crystal, both of which standards of frequency are of much greater accuracy than is available in the case of the ordinary wave meter.

Briefly stated, the present invention provides a simple and accurate indicating system of relatively low cost for indicating the coincidence of an oscillator frequency with a frequency determined by the combination of any one of a number of given frequencies with the resonant frequency of a single sharply resonant device of known resonant frequency. According to the invention, there is employed an ordinary superheterodyne receiver to receive broadcast frequencies, the received frequencies being combined with the output of the local oscillator to furnish an intermediate frequency which is passed through a crystal to provide a visible indication. The crystal is sharply resonant to a fixed frequency and provides great accuracy in determining the exact frequency of the local oscillator at a number of different frequencies. The receiver may include the usual radio frequency amplifying, detecting and selecting circuits, and means for giving both a visible and audible indication of the incoming signals. By using one and the same oscillator both as the master oscillator for the transmitter and also as the heterodyne oscillator of a superheterodyne receiver and passing the intermediate frequency produced thereby in the receiver through a sharply resonant crystal to give a visible indication, we can find the exact frequency of the oscillator from the known frequency of the broadcast signal being received. In order to prevent the local radio transmitter from interfering with the receiver, there should preferably be provided, in the receiver, a rejector circuit arranged to prevent current of the transmitter frequency from reaching the first radio frequency amplifier tube.

A better understanding of the invention may be had by referring to the following description, which is accompanied by a drawing embodying the principles of the invention.

The single figure of the drawing shows an oscillator circuit 1 of adjustable frequency which is used to provide excitation for a radio transmitter, indicated diagrammatically by the power amplifier 2 having an output circuit 15. In order to indicate the exact frequency of said oscillator at a number of different frequencies, there is provided a wave indicating system in the form of a superheterodyne receiver indicated diagrammatically within the box 3, whose dot-dash lines represent a shielded container. The oscillator 1 is utilized not only to excite the radio transmitter power amplifier 2, but also as the local oscillator of the superheterodyne receiving system. In order not to paralyze or interfere with the superheterodyne receiver 3, the receiver is shielded and there is provided therein a low pass filter system 4 for filtering out the local transmitter frequency originating from power amplifier 2 which is higher than the broadcast frequency range for which the receiver is effective. Receiver 3 includes the usual radio frequency amplifier 5, a first detector or frequency converter 6, an intermediate frequency amplifier 7, a detector 8, and an audio frequency utilization circuit 9. The tuning circuits of the radio frequency amplifier tube 5, detector 6 and oscillator 1 may be unicontrolled, as indicated by the dash lines interconnecting the variable reactance elements of these circuits. The local oscillator 1, whose frequency is to be determined, provides the heterodyne or beating frequency to the receiver over connection 10. The incoming signal energy received over the antenna 11 is supplied to the first grid of the frequency converter or detector 6, while the oscillator frequency is supplied to the second grid of the detector. The output circuit of detector 6 is tuned to the intermediate frequency produced by the beat between the incoming signal frequency and local oscillator frequency, and this intermediate frequency is amplified in vacuum tube 7 before being rectified by tube 8 and heard in the loud speaker or headphones 9. To obtain an indication of the frequency of the local oscillator, there is provided an extremely sharply selective path 12 in the form of a piezo electric crystal for selecting the intermediate frequency from the output of vacuum tube 7 and for passing this selected intermediate frequency to an indicating device indicated here diagrammatically as a detector 13 and an electron ray tube or "magic eye" 14. This "magic eye" may be of any well-known type, such as the RCA–6G5 type of tube. Neutralizing condenser 17 serves to neutralize the capacity coupling due to the unavoidable capacity in shunt to the crystal so that detector 13 is energized only when the intermediate frequency coincides with the resonant frequency of the crystal.

From what has gone before, it will be evident that the system of the invention not only provides an audible indication of the signal by means of loud speaker 9, but also a visible indication of the exact frequency of the oscillator tube 1, by means of the indicating device including the "magic eye" 14.

The operation of the invention will now be described: A station in the broadcast range is first selected in the usual manner by means of the tuning dials on the receiver, and the incoming signal which is impressed upon antenna 11 of the receiver is selected, amplified by radio frequency amplifier 5, and impressed upon the converter or detector tube 6 along with oscillations from the local oscillator 1. Assuming that the intermediate frequency amplifier tube 7 is tuned to 2900 kilocycles, this tube will amplify the output of the detector tube 6 and impress it upon the rectifier system 8, from which an audio frequency output is taken by the loud speaker 9. Another path for the intermediate frequency is through the extremely sharply selective crystal circuit 12, also tuned to the intermediate frequency, here 2900 kilocycles, and the sharply selected intermediate frequency carrier passed by the crystal is rectified by tube 13 to produce an indication, such as in the electron ray or so-called "magic eye" tube 14. Assuming that a station of frequency 710 kilocycles has been tuned in by the receiver at a frequency selecting system, and also assuming that the local oscillator has been adjusted to make the intermediate frequency in the receiver exactly 2900 kilocycles, it will be evident that the local oscillator frequency must be either 3610 kilocycles or 2190 kilocycles. The operator will usually know just which frequency the oscillator 1 is tuned to, or in the case of unicontrolled tuning of oscillation and radio frequency circuits the radio frequency tuning will permit reception of a given station only at one of the two otherwise possible oscillator frequencies, so that there will be no question as to which of the two possible frequencies the oscillator is generating. Under these conditions, the "magic eye" or electron ray tube 14 will show a definite indication which will be lacking if the oscillator frequency departs by even so little as a few hundred cycles from the above mentioned value. By listening to the audio output of the system, the identity of the station may be ascertained, so that there may be no question as to its frequency. For example, in the New York metropolitan area, a station of the frequency of 710 kilocycles is known by the call letters WOR. In a similar fashion, by tuning in any other known station the frequency of the oscillator may be checked at other points. The oscillator frequency is, in each case, equal to the station frequency plus 2900 when the station is accurately tuned as evidenced by the indication of the "magic eye" tube. The range of broadcast stations running from 600 kilocycles to 1100 kilocycles is sufficient to establish exact calibration points for the oscillator in the range from 3500 kilocycles to 4000 kilocycles. This last range constitutes the 80 meter short wave amateur band, and by successively doubling appropriate frequencies within this band, all of the frequencies in the higher bands may be obtained.

If it is desired to obtain oscillations from tube 1, whose frequency is within the lowest amateur frequency range, namely from 1700 kilocycles to 2000 kilocycles, a larger inductance coil may be plugged into the tuned oscillator circuit of the tube 1 in place of the coil now there, or an extra inductance inserted therein by a switching arrangement. In this case, the intermediate frequency is the sum of the station and oscillator frequencies so that stations tuned in between 900 kilocycles and 1200 kilocycles require a range of oscillator frequency from 2000 kilocycles to 1700 kilocycles, thus permitting the oscillator 1 to be accurately calibrated to a number of points within this range. The oscillator frequency is thus equal to the crystal frequency minus the station frequency when the station is accurately tuned to give an indication on the "magic eye." In this case, the oscillator and radio frequency circuit tuning controls must be independent or at least the unicontrol arrangements altered since a higher station frequency requires a lower oscillator frequency.

The entire receiving system 3, with the exception of the local oscillator 1, is provided solely for the purpose of indicating the exact frequency of the local oscillator and need not be operated once the oscillator has been accurately calibrated. If, however, it is desired to operate with great accuracy on a predetermined frequency, it is preferable to tune in the broadcast station whose reception requires a local oscillation of that frequency, and then to adjust carefully the local oscillator to cause and maintain the characteristic indication on the electron ray tube or "magic eye." It should be noted that the receiving system 3 including the local unmodulated oscillator 1 provides an excellent broadcast receiver for general use.

It has been seen that as the oscillator frequency is varied, the "magic eye" will close and simultaneously a broadcast program will be heard each time the oscillator frequency passes through a value equal to, for example, the sum of the crystal frequency and the frequency of the incoming signal of the broadcast station. Thus the "magic eye" indicates the exact frequency of the oscillator only at a number of points corresponding to the number of incoming broadcast signals that can be received in the particular locality of the receiver, but by interpolation between such points of precise frequency indication, intervening values of frequency may readily be obtained with more than sufficient accuracy for any ordinary purpose. One way of accomplishing this is to mark on the dial of the oscillator the oscillator frequencies corresponding to the broadcast stations received at those points as well as the station frequencies corresponding to the points; hence, if a frequency which is between any two points is desired, it will only be necessary to turn the dial to a point correspondingly intermediate to the known points on the opposite sides of the desired frequency.

The output 15 of the power amplifier tube 2 may be amplified and/or frequency doubled in conventional fashion in the transmitter proper, in order to produce a desired carrier frequency at a required power level. Of course, audio frequency modulation may be impressed upon the signals in the power amplifier of the transmitter in place of the keying effected by key 16.

What is claimed is:

1. Apparatus for determining the frequency of a local unmodulated oscillator at any one of a number of different frequencies, comprising in combination, a superheterodyne receiver capable of receiving a plurality of different broadcast waves in the range substantially between 600 kc. and 1200 kc., including a local unmodulated oscillator for beating with the received signals of known frequencies to produce an intermediate frequency, said oscillator generating a frequency whose wavelength is appreciably shorter than and outside the said range of broadcast signals, a local transmitter circuit, connections between said oscillator and said transmitter for utilizing said oscillator to excite said transmitter, means for rectifying the intermediate frequency of said receiving system to produce an audio frequency output, a sharply resonant selective system of known resonant frequency which is the same as said intermediate frequency for enabling said intermediate frequency to pass therethrough, and a circuit for indicating the output of said sharply resonant selective system, whereby said last circuit serves to indicate the difference between the frequency of the received waves and the resonant frequency of said sharply selective circuit.

2. A combination of apparatus in accordance with claim 1, characterized in this that said sharply resonant selective system is a piezo-electric crystal of known resonant frequency and said circuit for indicating the output thereof is an electron ray tube.

3. Apparatus for determining the frequency of a local unmodulated oscillator at any one of a number of different frequencies, comprising a superheterodyne receiving system capable of receiving a plurality of different waves in the range substantially between 600 kc. and 1200 kc., which frequencies are appreciably lower than the frequency of said oscillator, said receiving system including said oscillator for beating with the received signals to produce an intermediate frequency, a local transmitter circuit including a power amplifier, a connection from said oscillator to said power amplifier for exciting the same, a first path including a rectifier and an audio frequency output circuit coupled to said rectifier, and a second path including a sharply resonant selective circuit of known resonance frequency which is the same as said intermediate frequency, and a visual indicator coupled to said selective circuit, both paths being coupled to said receiver for individually accepting said intermediate frequency, whereby said visual indicator serves to indicate the difference between the frequency of said oscillator and the frequency of said received waves.

4. Apparatus in accordance with claim 3, characterized in this that said visual indicator is an electron ray tube.

5. The method of utilizing the precise frequency control equipment of a remote broadcast transmitter operating in the range substantially between 600 kc. and 1200 kc. for maintaining, with comparable precision but at a greatly higher frequency, the carrier frequency of a local short wave transmitter at a predetermined value which comprises generating local oscillations, and at the same time receiving broadcast waves from said remote transmitter, combining a portion of the energy of said oscillations with said received broadcast waves, indicating the relation between the frequencies of said locally generated and said received broadcast waves, controlling the frequency of said locally generated oscillations to maintain said relation at a predetermined value and utilizing said locally generated oscillations for the carrier frequency of said local transmitter.

WALTER VAN B. ROBERTS.